United States Patent [19]

Lanquist et al.

[11] Patent Number: 5,414,765
[45] Date of Patent: May 9, 1995

[54] NETWORK INTERFACE DEVICE HAVING SWITCH

[75] Inventors: Todd C. Lanquist, Watauga; James W. Goodson, Fort Worth, both of Tex.

[73] Assignee: Siecor Corporation, Hickory, N.C.

[21] Appl. No.: 111,323

[22] Filed: Aug. 23, 1993

[51] Int. Cl.[6] .............................................. H04M 1/00
[52] U.S. Cl. .................................. 379/399; 379/412; 379/395; 379/21; 379/37
[58] Field of Search ................. 379/399, 412, 395, 21, 379/37

[56] References Cited

U.S. PATENT DOCUMENTS

| | | | |
|---|---|---|---|
| 4,349,236 | 9/1982 | Guelden | 439/142 |
| 4,562,311 | 12/1985 | Dola | 379/412 |
| 4,588,238 | 5/1986 | Michaelson et al. | 339/91 R |
| 4,723,919 | 2/1988 | Crane | 439/521 |
| 4,741,709 | 5/1988 | Jervis | 439/521 |
| 4,749,359 | 6/1988 | White | 379/399 |
| 4,917,617 | 4/1990 | Smith | 439/135 |
| 5,195,125 | 3/1993 | Bliven et al. | 379/29 |

Primary Examiner—James L. Dwyer
Assistant Examiner—Jacques M. Saint-Surin
Attorney, Agent, or Firm—J. David Abernethy

[57] ABSTRACT

Disclosed is a network interface device for connecting network wiring to a subscriber's wiring at a subscriber's premises, the network interface device having a door covering a test jack, with means for connecting the network wiring to the subscriber wiring when the door is closed and connecting the network wiring to the test jack when the door is open.

8 Claims, 4 Drawing Sheets

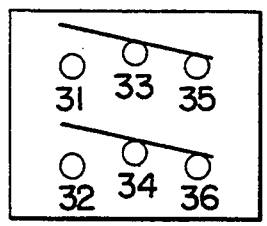
FIGURE 5.
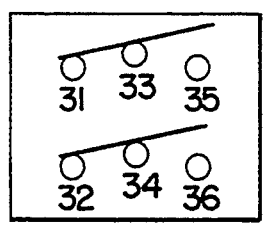
FIGURE 6.
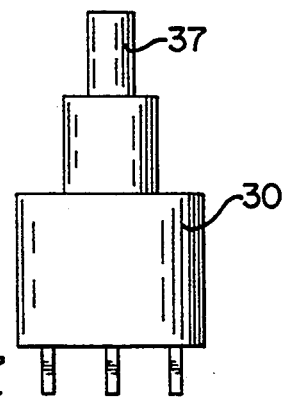
FIGURE 7.
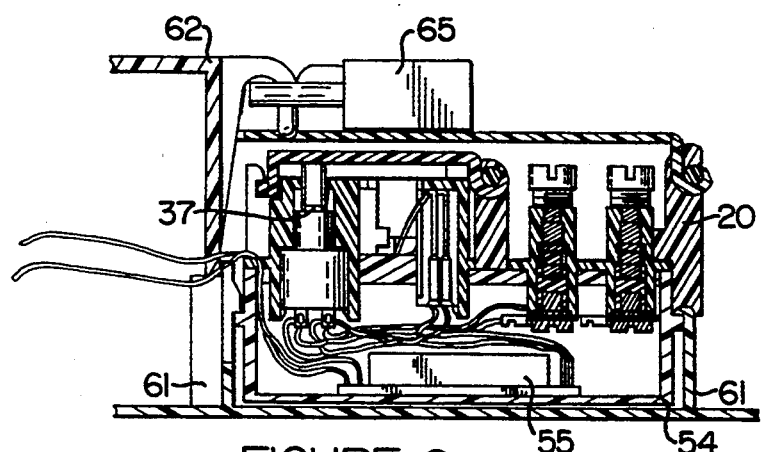
FIGURE 9.
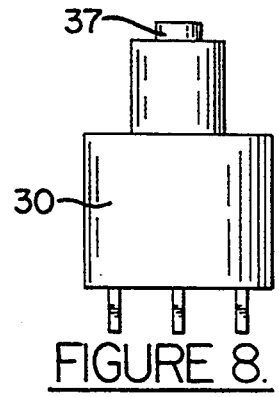
FIGURE 8.
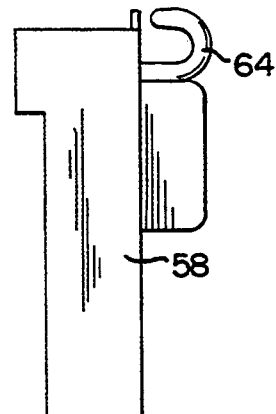
FIGURE 10.
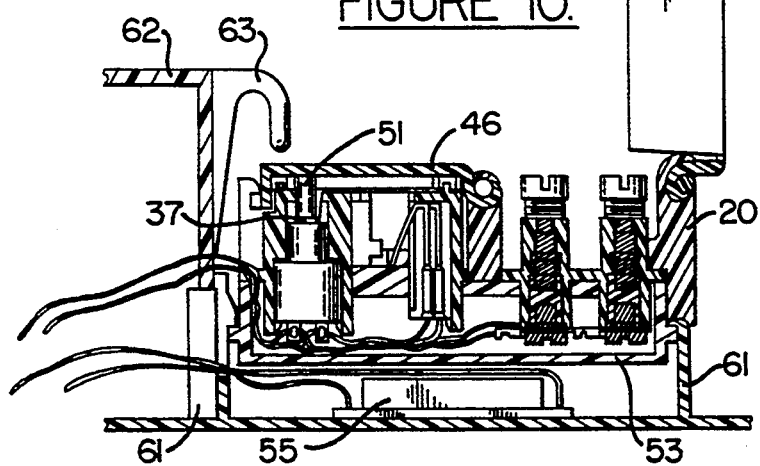

NETWORK INTERFACE DEVICE HAVING SWITCH

BACKGROUND OF THE INVENTION

Network interface devices provide a demarcation point between network wiring, normally owned by a telephone company, to a subscriber's wiring at a subscriber's premises. A network interface device also usually contains a test jack so that a device known to be operational, such as a telephone, may be plugged into the test jack for connection to the network wiring. If a dial tone is received, it is thereby determined that the network wiring is operational, so a fault must be located in the subscriber's wiring. On the other hand, if no dial tone is received, the fault lies between the telephone company's central office and the network interface device.

Although network interface devices have been shown to be very reliable, an area found to be relatively susceptible to failure is the electrical interface associated with the plug and jack area. A plug is inserted into the test jack during normal operation. Therefore, it was found to be desirable to remove the test jack from the electrical circuit except during the time the test jack was actually being used to test an operating telephone. U.S. Pat. No. 4,562,311, issued to Dola, describes a telephone network interface device having a sliding cover which covers the test jack and the remainder of the network interface device, including the subscriber's wiring terminals. The sliding cover has mating metal terminals to selectively connect the network wiring to subscriber wiring when the door is closed and to the test jack when the door is slid open.

It is believed that the mechanical switch having sliding metal connections could be improved by the use of more modern switches. Furthermore, Dola's device does not allow telephone company employees to test the set of subscriber terminals, which are covered when Dola's cover is closed and disconnected when the cover is open.

Therefore, it is believed that the state of the art would be improved by a modernized device which would accomplish Dola's purpose, but by using a better switch and without obstructing access to the entire network interface device.

SUMMARY OF THE INVENTION

The improved network interface device according to the invention, like other network interface devices, contains a set of terminals to which subscriber wiring may be connected and a test jack to which a device known to be operational may be connected. The improved device contains a switch in electrical communication with telephone company network wiring, the test jack, and the set of subscriber terminals. The switch places the network wiring in electrical communication with the test jack, but not the set of terminals, when the switch is in a first position. The switch places the network wiring in electrical communication with the set of subscriber terminals, but not the test jack, when the switch is in a second position. A jack door covers the test jack when the jack door is closed and does not cover the test jack when the jack door is open. The jack door does not cover the set of subscriber terminals. Activation means cause the switch to be in its first position when the jack door is open and in second position when the jack door is closed.

In the preferred embodiment, a double pole/double throw momentary push button switch is utilized in the improved network interface device.

In another feature of the improved network interface device, a security door may close to cover the set of subscriber terminals, the jack door, and the test jack; however, the security door can close only if the jack door is closed. In the preferred embodiment, a tab mounted on the jack door makes physical contact with the switch only when the jack door is closed, thereby controlling the switching process.

In yet another feature of the invention, the test jack is environmentally sealed.

Other features of the invention will become apparent in the detailed description which follows.

BRIEF DESCRIPTION OF THE DRAWINGS

The preferred embodiments are described with the aid of the drawings in which:

FIG. 5 is a schematic view of the switch terminal connections when the jack door is open;

FIG. 6 is a schematic view of the switch terminal connections when the jack door is closed;

FIG. 7 is a schematic view of the switch when the jack door is open;

FIG. 8 is a schematic view of the switch when the jack door is closed;

FIG. 9 is a side view of the module using a deep base; and,

FIG. 10 is a side view of the module using a shallow base.

DETAILED DESCRIPTION OF THE PREFERRED EMBODIMENT

Figure 1:
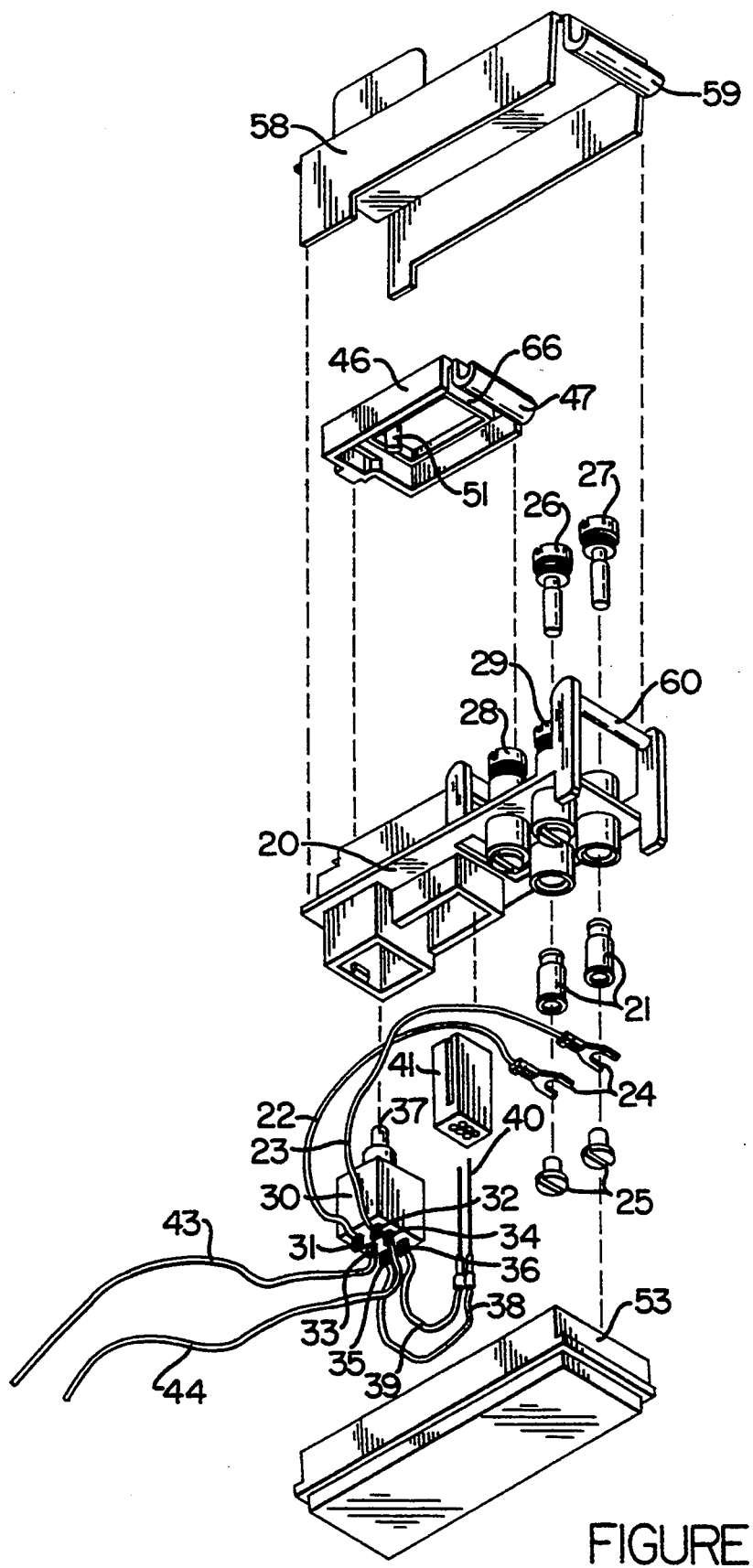
FIG. 1 is a perspective view of the module as disassembled.
Figure 2:
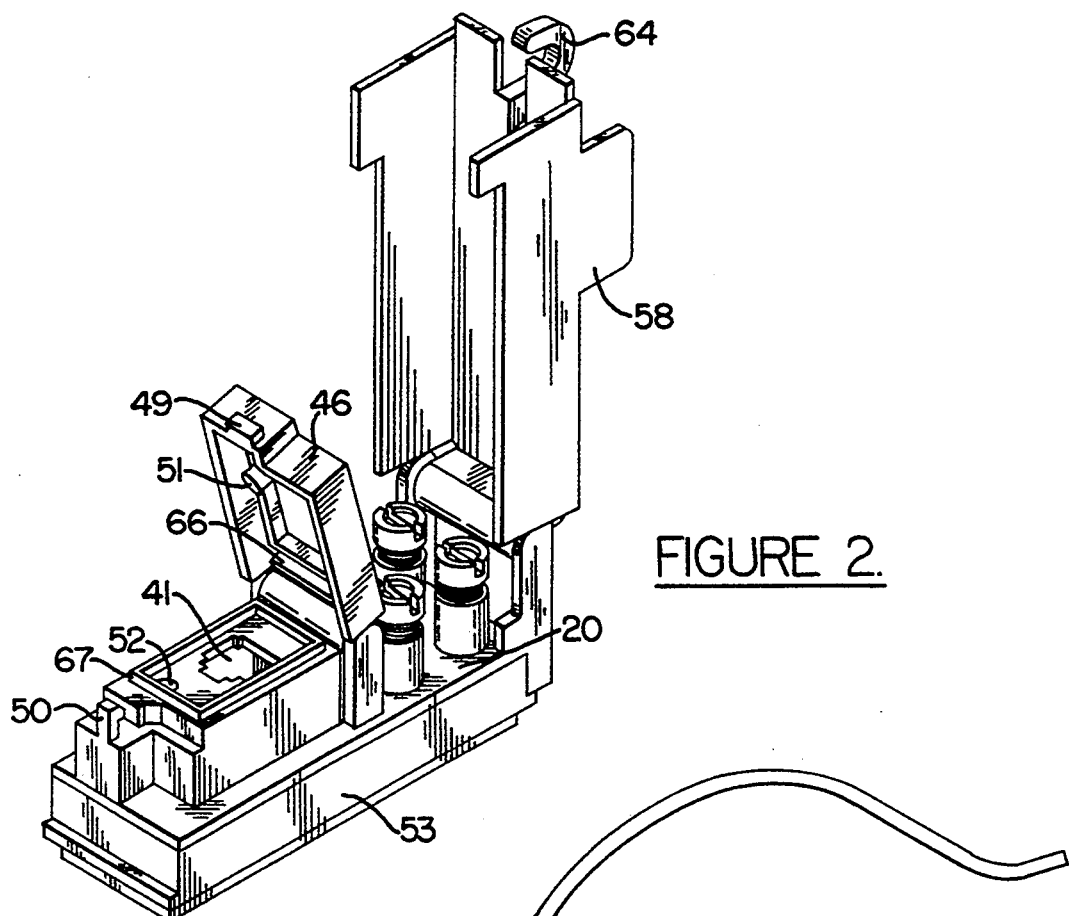
FIG. 2 is a perspective view of the assembled module.

FIG. 1 shows a view of the components of module 20 and how they are assembled together. Metal (brass) inserts 21 are assembled into the module 20 from the bottom. Subscriber wires 22, 23 (tip and ring respectively) with spade terminals 24 on one end are terminated to inserts 21 using a small screw fastener 25 which screws into insert 21. Four washer screw terminals 26, 27, 28, 29 are screwed into the opposite end of inserts 21 from the top of module 20. Inserts 21 provide continuity from premises screws 26, 27 (tip and ring respectively) to subscriber wires 22, 23 (tip and ring respectively).

Four screw terminals provide the capability of terminating up to eight wires to both tip and ring. Shorting bars (not shown) may replace spade terminals 24 to provide continuity between two inserts 21 creating two terminals shorted to the same single wire. For example, screw terminals 26 and 28 would be shorted together to provide the tip connections and screw terminals 27 and 29 would be shorted together to provide the ring connections. This would allow two screw terminals 26, 28 for tip connections and two screw terminals 27, 29 for ring connections to accommodate multiple wire connections. The opposite ends of subscriber wires 22, 23 are soldered to the momentary solder terminals 31, 32

(tip and ring respectively) on the bottom of the switch 30.

Figure 3:
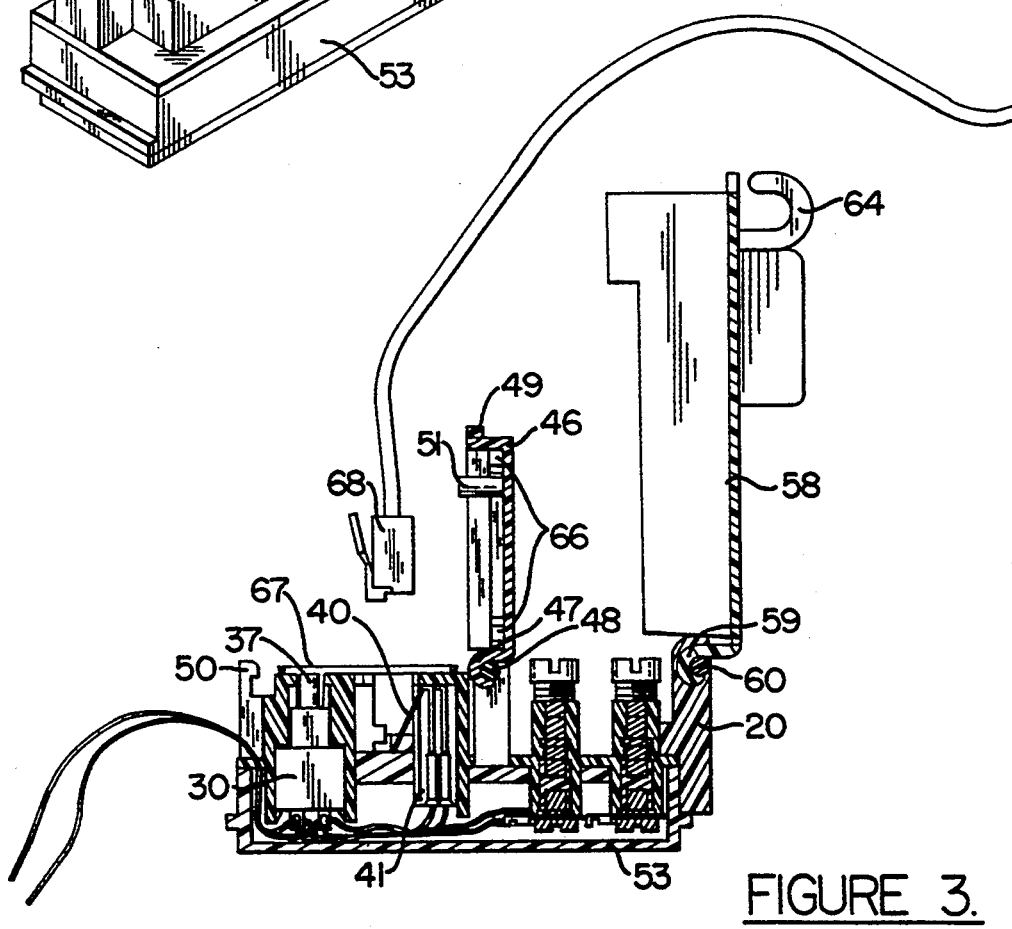
FIG. 3 is a side view of the module and a telephone plug.

Test jack wires 38, 39 (tip and ring respectively) have gold wire 40 terminated to one end which is inserted into test jack 41. After insertion into test jack 41, gold wires 40 are bent over (as shown in FIG. 3) and test jack 41 is assembled into the module 20 from the bottom. Test jack 41 provides a testing means from the top of the module 20 using a working telephone plug 68 which plugs into test jack 41 through an opening in the top of module 20, as shown in FIG. 3.

The opposite ends of test jack wires 38, 39 are soldered to no-momentary solder terminals 35, 36 (tip and ring respectively) on the bottom of switch 30.

Telephone network wires 43, 44 (tip and ring respectively) are soldered to always live solder terminals 33, 34 (tip and ring respectively) on the bottom of switch 30. The other end of the Telco wires 43, 44 proceed to either electronics, protectors, or Telco connections of some kind.

Switch 30 is also assembled into the module 20 from the bottom.

All the wire terminations are terminated to the bottom of the module 20 to be totally submerged within a potting compound.

Module 20 has a molded-in standing rib 67 on the top surface around the switch actuator and test jack openings. The underside of inner jack door 46 has a molded-in trough 66 formed by standing walls around the perimeter of inner door 46. Trough 66 is filled with a two-part silicone gel and cured. Inner door 46 is assembled to module 20 by snapping inner door hinge 47 onto hinge pin 48. Inner door 46 will then snap into place by pressing inner door catch 49 under module latch 50, thus forcing standing rib 67 into gel-filled trough 66 between the standing walls. When inner door 46 is in the closed position, standing rib 67 will be immersed into the silicone gel, creating a watertight seal around test jack 41 and switch actuator clearance hole 52 on top of module 20.

Other alternatives to seal up around test jack 41 and switch actuator clearance hole 52 on top of the module 20 are: (1) Using a gasket. Instead of a gel trough, a gasket adheres to the underside of inner door 46 to a flat surface by means of an adhesive surface on one side of the gasket. Inner door 46 will then snap into place by pressing inner door catch 49 under module latch 50, thus forcing standing rib 67 into the gasket which compresses and creates a watertight seal. (2) Utilizing two part molding to seal like a gasket. But instead of attaching to the inner door by an adhesive back, it would be a two part molding operation in which a silicone material would be molded directly onto the underside of inner door 46. (3) Using a molded plastic part, possibly silicone, seal like a gasket. This molded part would be assembled to the underside of inner door 46 by mechanical means (example snap-fit). All three alternatives will provide a watertight seal around test jack 41 and switch actuator clearance hole 52, on top of module 20.

When inner door 46 is closed, activator post 51 travels through clearance hole 52 in module 20 and presses down actuator 37 on switch 30 placing it in the depressed position of FIG. 8. See FIG. 6. When switch 30 is depressed, terminals 31 (tip) and 33 (tip) are connected together to connect subscriber wire 22 (tip) to Telco wire 43 (tip), and terminals 32 (ring) and 34 (ring) are connected together to connect subscriber wire 23 (ring) to Telco wire 44 (ring). The circuit is then complete from subscriber screw terminals 26, 27, 28, 29 to Telco connections through Telco wires 43, 44. Test jack 41 is out of the circuit in this position.

When inner door 46 is opened, activator post 51 releases actuator 37 on switch 30 bringing it to its upright position as shown in FIG. 7. See FIG. 5. When switch 30 is in the upright position, terminals 35 (tip) and 33 (tip) are connected together to connect test jack wire 38 (tip) to Telco wire 43 (tip), and terminals 36 (ring) and 34 (ring) are connected together to connect test jack wire 39 (ring) to Telco wire 44 (ring). The circuit then goes from wires 40 to the Telco connections through Telco wires 43, 44. The test jack is then active for testing and subscriber terminals 26, 27, 28, 29 for customer wiring are then disconnected.

There may be two different sizes of potting bases: Shallow base 53, and deep base 54 to hold built-in electronics 55. Shallow base 53 can be used on a module assembly not requiring electronics 55, non-sealed electronics, or to add electronics at a later time by splicing them into the circuit and storing them in the space provided underneath the module assembly as shown in FIG. 10.

Deep base 54 will be used on the module assembly requiring sealed electronics or possibly sealed protectors. In this case, electronics 55 will be wired directly into the circuit and placed inside deep base 54 as shown in FIG. 9.

Base 53, 54 will be filled with a potting compound. The potting compound is poured into the base from the top. Module 20 will then be snapped onto base 53 or 54 from the top. The potting compound level is to be well above all the wire terminations to seal them within the encapsulant. Test jack 41 is designed to accept a longer than normal gold wire 40, so that exposed test jack wires 38, 39 will be totally submerged in the potting compound, leaving only protected gold coated wires 40 extending above the potting compound level. Protective walls extending from the bottom of module 20 are designed to surround test jack 41, switch 30, and the subscriber towers, and provide a sealed off area within the potting compound preventing any air pockets around any wires and terminations.

Individual line security door 58 is assembled to module 20 by snapping outer door hinge 59 to module hinge pin 60.

FIGS. 9 and 10 show the assembled module snapping into network interface device (NID) enclosure base 61 with Telco shield 62 which is secured to base 61 with Telco security screw (security screw not shown). Telco shield 62 separates the assembled module from the Telco area. Padlock latch 63 molded into Telco shield 62 rests beside individual line security door hook 64 when outer door 58 is in the closed position to accept customer padlock 65.

Figure 4:
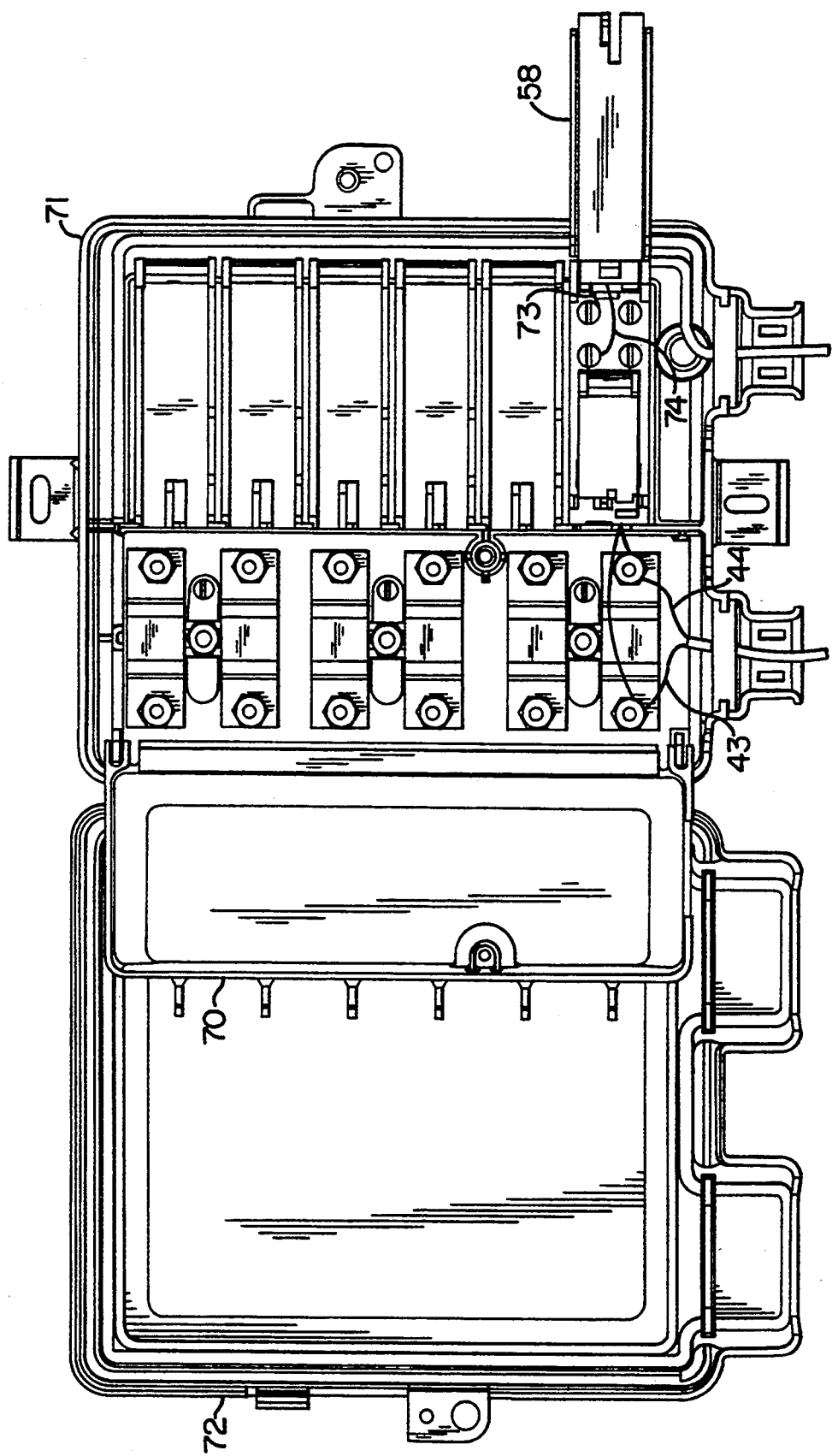
FIG. 4 is a plan view of the module inserted in a network interface device.

The completed module assembly can be used as shown in FIG. 4. Subscriber wiring 73, 74, is connected to terminals 26, 27. Also shown are NID base 71, telco door 70 and outer door 72.

In the preferred embodiment, the switch is a double pole-double throw switch. Actuator 37 travels around 0.125 inch. The contact action is momentary and contact action is make-before-break (shorting). Its termination is solder tail.

All electrical connections are metallic. Unless otherwise described, all other components are molded plastic.

The invention also can be used when all electrical connections and electronics are built into a PC board.

What is claimed is:

1. A network interface device for terminating network wiring at a subscriber's premises and for connecting the subscriber's wiring to the network wiring, comprising:

a set of terminals to which subscriber wiring may be connected;

a test jack to which a device known to be operational may be connected;

a switch in electrical connection with network wiring, the test jack, and the set of terminals, the switch placing the network wiring in electrical communication with the test jack but not the set of terminals when the switch is in a first position and with the set of terminals but not the test jack when the switch is in a second position;

a first door, not covering the set of terminals, which covers the test jack when the first door is closed and which does not cover the test jack when the first door is open; and, activation means for causing the switch to be in its first position when the first door is open and in its second position when the first door is closed.

2. A network interface device as described in claim 1, wherein the switch is a double pole/double throw momentary pushbutton switch.

3. A network interface device as described in claim 1, further comprising a second door which when closed covers the set of terminals, the first door, and the test jack, which second door can close only if the first door is closed.

4. A network interface device as described in claim 3, wherein an activation member mounted on the first door makes physical contact with the switch only when the first door is closed.

5. A network interface device as described in claim 3, wherein the switch is a double pole/double throw momentary pushbutton switch.

6. A network interface device as described in claim 1, wherein an activation member mounted on the first door makes physical contact with the switch only when the first door is closed.

7. A network interface device as described in claim 6, wherein the switch is a double pole/double throw momentary pushbutton switch.

8. A network interface device as described in claim 7, further comprising a second door which when closed covers the set of terminals, the first door, and the test jack, which second door can close only if the first door is closed.

* * * * *